Patented Apr. 11, 1939

2,153,837

UNITED STATES PATENT OFFICE 2,153,837

INSULATING CONCRETE CONSTRUCTION

Noak Victor Hybinette, Jackson, Mich.

No Drawing. Application June 18, 1935,
Serial No. 27,187

12 Claims. (Cl. 106—24)

The present invention relates to improvements in the art of constructing walls and partitions of buildings which are to act as insulation for heat and sound.

Heretofore it has been recognized that concrete expanded by gas evolution is a superior material for insulation. It has only been possible to produce such expanded concrete in blocks which are handled in the building trade very much like bricks and tiles. Although various attempts have been made to change the prior practice, none of the proposals as far as I am aware, has been wholly satisfactory and successful.

It is an object of the present invention to erect a wall of concrete in situ which is capable of insulating the building with respect to heat and sound.

A further object of the invention is to provide a process of constructing insulating concrete structures which can be carried into practice at practically any site at which water is available.

It is also within the contemplation of the invention to provide a process of constructing concrete insulating structures which can be carried in practice economically and readily, which incorporates powdered aluminum to evolve gas, and which distributes paper pulp throughout the mass to suspend the heavy particles which otherwise would sink to the bottom and to keep the gas from escaping before the cement has started to set.

Other objects and advantages will become apparent from the following description.

The present invention aims at the pouring of concrete walls and partitions in situ. In prior attempts, it has been found that the bottom of the wall has been of an entirely different composition from the top. Furthermore, it has been found that wire netting or expanded metal inserted in the mould released the gas bubbles and caused the collapse of the bubbles and caused the collapse of the mass before the cement has started to set.

Broadly stated, my process contemplates adding so much water to the concrete slurry as to make up the total volume of the final expanded wall, etc. I also add a small quantity of light fibrous material, such as ordinary paper pulp. I have discovered that the quantity of such paper pulp needed is very insignificant. Thus, suppose that it is desired to make a wall 9 feet by 9 feet by 4 inches thick which is a volume of about one cubic yard, I take into consideration the gravity of concrete which is desired. The concrete may be as light as 400 lbs. per cubic yard or it may be as much as 800 to 1200 lbs. per cubic yard or more. For ordinary purposes about 800 lbs. per cubic yard is normal. I may use about $9/10$ cubic yard of water to which is added about 150 to 300 lbs. of cement depending on the strength of the wall. I add about 15 to 30 lbs. of lime (CaO) to make up for the lime dissolved from the cement. To this mix, paper pulp is added in the amount of about 3 to 10% of the weight of the cement. For the purpose of giving the mixture more strength, I may add an aggregate, such as ordinary building sand to the extent of as much as 1 to 5 times the amount of cement. Furthermore, I may incorporate a certain amount of gas-producing agents or chemicals. For this purpose, I add about 1/10% of the weight of the cement of aluminum in the state of fine division such as flakes or powder.

In my copending applications (Serial No. 10,092 and Serial No. 13,492), I have described the beneficent action of oil, such as ordinary fuel oil as an addition in the use of such powder. In another co-pending application (Serial No. 27,858, filed June 22, 1935), I have disclosed the use of a form for pouring such wall into such form being provided with a filtering arrangement which acts to remove water. I prefer to use such a filtering form in connection with the present invention, although I do not wish to be limited thereto as any appropriate form may be used to remove water.

My slurry of cement is thoroughly mixed and the form is filled in the usual way with concrete forms. After 24 hours or thereabouts, the forms may be removed and it will be seen that the small addition of paper pulp has been able to keep the cement and aggregate in suspension so that the concrete has hardened into a uniform porous wall whether aluminum powder or other gas evolving chemical is used.

It is to be understood that the paper pulp may be treated so as to preserve it or I may substitute some other light material which will serve to keep the cement in suspension.

It is to be understood that when expanding or gas evolving agents are used the amount of water may be correspondingly reduced. I have also found that less paper pulp is needed if a gas evolving agent is used. Likewise the amount of paper pulp should be adjusted according to the amount of sand (aggregate) that is used. I prefer that the aggregate pass through a 4 to 8 mesh screen. In the claims it is intended that the term "aggregate" include hard stone-like particles which shall include particles larger than those commonly known as comprising screened sand.

I claim:—

1. The process of constructing concrete insulating structures in situ which comprises forming a slurry of cement and aggregate containing water sufficient to constitute the volume of the finished structure, incorporating paper pulp to effect and maintain a substantially uniform suspension of the cement and aggregate in said slurry, filling said slurry into forms having the shape of the structure to be constructed, and permitting said slurry to set.

2. The process of constructing concrete insulating structures in situ which comprises forming a slurry of cement and aggregate containing water sufficient to constitute the volume of the finished structure, incorporating paper pulp to effect and maintain a substantially uniform suspension of the cement and aggregate in said slurry, adding a gas evolving agent to said slurry, filling said slurry into forms having the shape of the structure to be constructed, and permitting said slurry to set.

3. The process of constructing concrete insulating structures in situ which comprises forming a slurry of cement and aggregate containing water sufficient to constitute the volume of the finished structure, incorporating paper pulp to effect and maintain a substantially uniform suspension of the cement and aggregate in said slurry, adding powdered aluminum, filling said slurry into forms having the shape of the structure to be constructed, and permitting said slurry to set.

4. The process of constructing concrete insulating structures in situ which comprises forming a slurry of cement and aggregate containing water sufficient to constitute the volume of the finished structure, incorporating paper pulp to effect and maintain a substantially uniform suspension of the cement and aggregate in said slurry, adding powdered aluminum and lime, filling said slurry into forms having the shape of the structure to be constructed, and permitting said slurry to set.

5. The process of constructing concrete insulating structures in situ which comprises forming a slurry of about 150 to 300 lbs. of cement, aggregate to the amount of 100 to 500% of the weight of the cement and about 8/10 of a cubic yard of water, incorporating paper pulp to an extent of about 3 to 10% of the weight of the cement to effect and maintain a substantially uniform suspension of the said cement and aggregate in the slurry, adding about 15 to 30 lbs. of lime, mixing said mass to effect a thorough and uniform distribution of the materials, filling the mixture into forms having the shape of the structure to be constructed, and permitting said mixture to set.

6. The process of constructing a concrete structure which comprises forming a slurry of a hydraulic cement, an aggregate and water incorporating a relatively small portion of fibrous material in said slurry to maintain a substantially uniform suspension of the aggregate in said slurry, filling the slurry and fibrous material into forms having the shape of the structure to be constructed and permitting said mixture to set.

7. A concrete mixture adapted to be mixed with water to form concrete comprising a hydraulic cement, an aggregate and a relatively small proportion of a fibrous material to maintain said aggregate in suspension before the setting of the concrete.

8. A concrete mixture adapted to be mixed with water to form concrete comprising a hydraulic cement, an aggregate and a relatively small portion of paper pulp to maintain said aggregate in suspension before the setting of the concrete.

9. A concrete mixture adapted to be mixed with water to form an expanded concrete comprising a hydraulic cement, an aggregate, a gas evolving agent and a relatively small proportion of fibrous material to maintain said aggregate in suspension and to prevent the mass from collapsing before the setting of the concrete.

10. A concrete mixture adapted to be mixed with water to form an expanded concrete comprising a hydraulic cement, an aggregate, a gas evolving agent, and a relatively small portion of paper pulp to maintain said aggregate in suspension and to prevent the mass from collapsing before the setting of the concrete.

11. A concrete mixture adapted to be mixed with water to form concrete comprising a hydraulic cement, an aggregate comprising ordinary building sand, and a relatively small portion of paper pulp to maintain said aggregate in suspension before the setting of the concrete.

12. A concrete mixture adapted to be mixed with water to form concrete comprising a hydraulic cement, an aggregate comprising ordinary building sand, and a relatively small portion of light fibrous material to maintain said aggregate in suspension before the setting of the concrete.

NOAK VICTOR HYBINETTE.